United States Patent [19]

Pondrom, Jr.

[11] 4,117,318

[45] Sep. 26, 1978

[54] OPTICAL POSITION PICK-OFF IN ZERO-DRAG SATELLITE

[75] Inventor: Walter L. Pondrom, Jr., Fullerton, Calif.

[73] Assignee: The United States of America as represented by the Secretary of the Air Force, Washington, D.C.

[21] Appl. No.: 797,143

[22] Filed: May 16, 1977

[51] Int. Cl.² .............................................. G01J 1/20
[52] U.S. Cl. .................................. 250/201; 244/171; 250/206
[58] Field of Search .......... 74/5.6 A; 250/201, 203 R; 244/165, 171

[56] References Cited

U.S. PATENT DOCUMENTS

| 3,439,547 | 4/1969 | Slater ................................. 74/5.6 A |
| 3,499,332 | 3/1970 | Fingerett et al. ................... 74/5.6 A |
| 3,501,967 | 3/1970 | De Cotiis ............................ 74/5.6 A |
| 3,532,892 | 10/1970 | Murphy ............................ 250/203 R |
| 3,535,525 | 10/1970 | Minkowitz ..................... 250/203 R X |
| 3,654,475 | 4/1972 | Montpas .......................... 250/203 R |

*Primary Examiner*—Lawrence J. Dahl
*Attorney, Agent, or Firm*—Joseph E. Rusz; George Fine

[57] ABSTRACT

An optical position pick-off for proof-mass in a zero-drag satellite is obtained by placing a spherical mass shielded from all forces except gravity, between a flat screen having four equally spaced photodetectors and a light source. The mass interrupts the light beam and casts a circular shadow on the screen, the periphery of which passes through the center of each of the detectors. A shift in the mass in any direction causes its shadow to cover more of certain detectors and less of others or more of all or less of all. The unbalance of the detectors may be used to actuate small jets to change direction of the satellite until the mass returns to its null position.

5 Claims, 2 Drawing Figures

OPTICAL POSITION PICK-OFF IN ZERO-DRAG SATELLITE

STATEMENT OF GOVERNMENT INTEREST

The invention described herein may be manufactured and used by or for the Government for governmental purposes without the payment of any royalty thereon.

BACKGROUND OF THE INVENTION

A simple satellite does not normally follow a free-fall gravitational orbit, but is subject to drag forces due to the residual atmosphere, radiation pressure, collisions with meteroids, etc. This requires frequency updating of the satellite ephemeris in order to use it for navigational purposes.

A new concept called a zero-drag or drag-free satellite incorporates very small jets and a fuel supply to just counteract the drag forces. This is accomplished by incorporating into the satellite a proof-mass which is shielded from all effects except gravity. The position of the proof-mass relative to the rest of the satellite is sensed by a pick-off and the jets are controlled to keep the pick-off at null and thus make the satellite follow the proof-mass which is in free-fall since the null position of the proof-mass is made to be at a position where the gravitational effects of the rest of the satellite cancel.

An electronic pick-off is the only pick-off embodiment reduced to practice, and is very critical due to the large gaps required. This leads to the alternative, such as the optical shadowing apparatus of the present invention which provides highly desirable results.

SUMMARY OF THE INVENTION

An optical position pick-off using shadowing techniques for proof-mass in a zero-drag satellite is provided. A spherical proof-mass is utilized and it is assumed that it is completely opaque. The spherical mass is shielded from all forces except gravity and the very small radiation pressure due to a light source. It is positioned between a flat screen having four equally spaced photodetectors and a light source. The mass interrupts the light beams from the source and casts a circular shadow on the screen, the periphery of which passes through the center of each of the photodetectors. A shift in the mass in any direction causes its shadow to cover more of less of certain photodetectors. The unbalance of photodetector outputs may be used to actuate small jets to change direction of the satellite until the mass returns to its null position.

DETAILED DESCRIPTION OF PREFERRED EMBODIMENT

Figure 1:
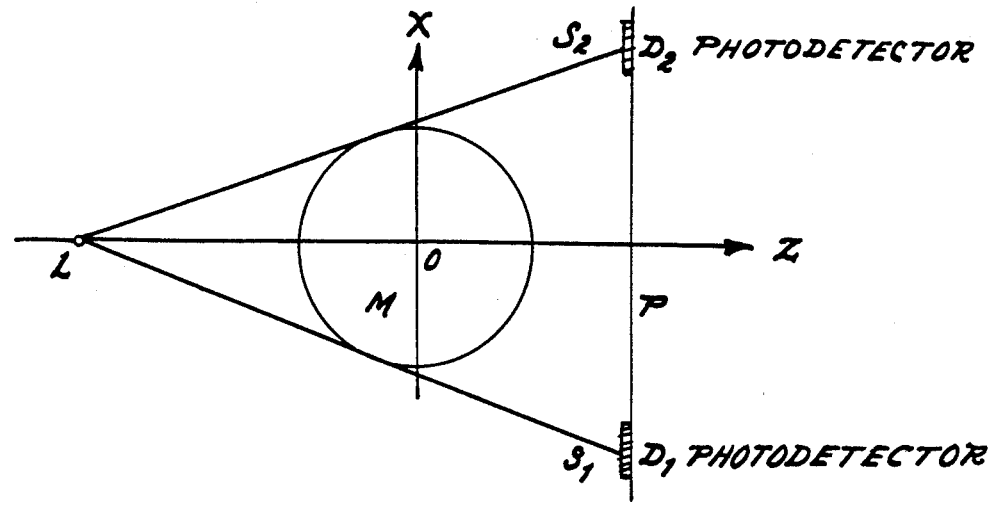
FIG. 1 shows a view perpendicular to XZ plane of the preferred embodiment of the optical position pick-off.
Figure 2:
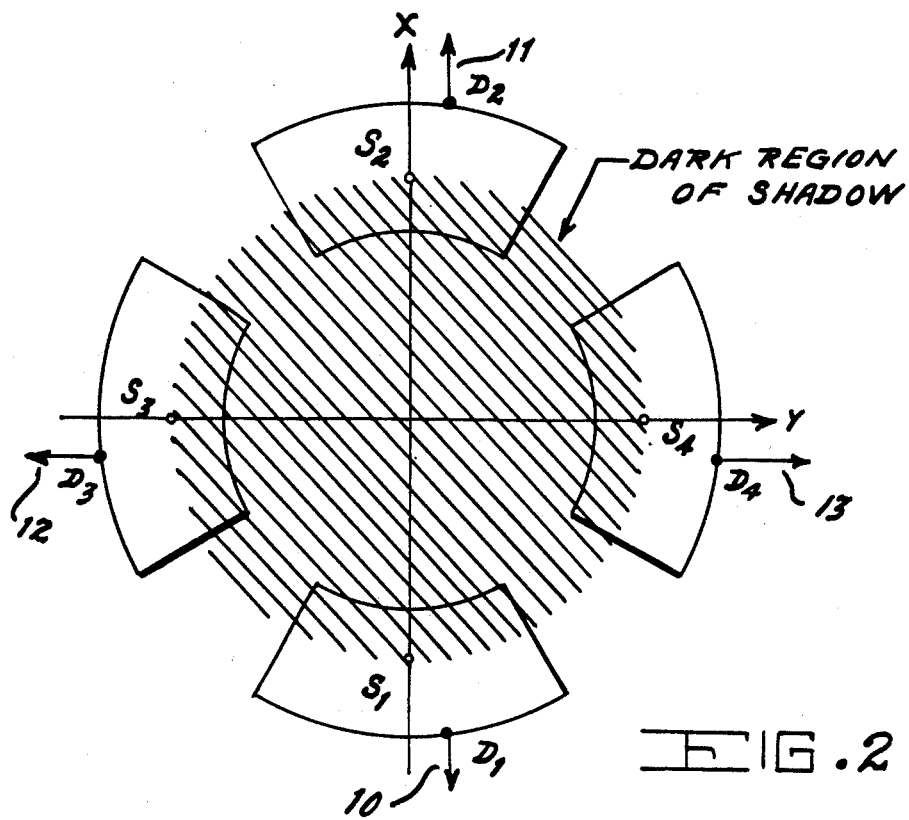
FIG. 2 shows a view of the photodetectors and associated flat screen used in FIG. 1 along OZ.

The preferred embodiment is illustrated in FIG. 1 in which M is a spherical proof-mass. L is a point source of light (at least a source whose dimensions are much smaller than the diameter of proof-mass M). Flat screen P is shown upon which have been incorporated four conventional photodetectors as shown in FIG. 2. Spherical proof-mass M is assumed to be completely opaque and shielded in any conventional manner from all effects except gravity.

It is also obvious to anyone skilled in the art that if the radiation pressure generated by the single light source provides a significant error, this effect may be compensated by a second identical light source of equal radiance situated diametrically opposite to the first light source at an equal distance from the nominal location of the center of the sphere. This second light source must be suitably shielded and masked so as to illuminate an equal area of the ball as that illuminated by the first light source, with such equal areas symmetrically disposed about a plane passing through the nominal position of the center of the sphere and perpendicular to the line joining the two light sources. Light from the second source must not reach the original array of photodetectors $D_1$ through $D_4$, before or after reflection from the sphere. The masks and apertures can be arranged to accomplish this end. When the sphere is in the nominal position, the net force acting upon it will be gravitational.

It is also obvious to anyone skilled in the art that, when two such light sources are used, as above, a second array of photodetectors could be located on a screen symmetrically disposed about the plane described above relative to the first set. This in effect provides two pick-offs whose outputs may be suitably combined so as to yield the same information as with the single pick-off embodiment but with slightly improved linearity and slightly improved signal-to-noise ratio.

It is also obvious to anyone skilled in the art that the light source can be amplitude modulated and the resulting photodetector voltages demodulated in order to get improved null stability or to make the device more compatible with other system requirements. The information ultimately obtained is the same as in the basic embodiment described above.

It is convenient to describe the position of the center of proof-mass M relative to its nominal position, O, by means of orthogonal cartesian corrdinates measured along $\vec{ox}$, $\vec{oy}$, and $\vec{oz}$. In FIG. 1, $\vec{oy}$ is pointed up out of the paper.

As proof-mass M is displaced in the positive direction along $\vec{ox}$, the dark part of the shadow (the interior of the circle passing through $s_1$, $s_2$, $s_3$, and $s_4$ with $s_3$ and $s_4$ shown in FIG. 2) will cover more of photodetector $D_2$ and less of photodetector $D_1$. Thus if the electric currents $I_1$, $I_2$, $I_3$, $I_4$ are respectively the photoelectric currents in the photodetectors $D_1$, $D_2$, $D_3$, and $D_4$, with $D_3$ and $D_4$ shown in FIG. 2, the $x$ displacement of the proof-mass is given by $$x = k_x(I_1 - I_2) \qquad (1)$$

and similarly for a displacement along $\vec{oy}$ $$y = k_y(I_3 - I_4) . \qquad (2)$$

The "constants" of proportionality $k_x$ and $k_y$ are nominally equal and depend on the geometry, the power radiated by the light source L, and the photodetector sensitivity.

If the proof-mass is displaced in the positive direction along $\vec{oz}$, the shadow-boundary circle $\overline{s_1 s_2 s_3 s_4}$ shrinks in diameter thus illuminating more of each photodetector. Thus the $z$ coordinate may be found from $$z = k_z(I_1 + I_2 + I_3 + I_4 - 4I_o) \qquad (3)$$

where $I_o$ is the nominal value of each photodetector current when the proof-mass is centered at the origin of coordinates, O, and $k_z$ is another "constant" of proportionality.

As described here, the device provides a three-axis displacement pick-off for the proof-mass using a single "point" source of light and a multiplicity of photodetectors. It should be apparent to anyone skilled in the art that the same results may be accomplished with a minimum of three photodetectors instead of the four described here, or indeed with any number of photodetectors greater than or equal to three. Four photodetectors leads to the simplest mathematical description and physical visualization.

It is also obvious to anyone skilled in the art that this device may also include suitable masks and apertures to reduce the effects of unwanted light paths (multiple reflections). It is not possible to enumerate these without knowing the precise details of the mechanical limit stops and mechanical caging mechanism for the proof-mass. These mechanical provisions are used in order to successfully launch and initialize the satellite. The mechanical limit stops also restrict the travel of the proof-mass to the range of positions over which the position pickoff is linear ($k_x$, $k_y$, and $k_z$ are approximately constant).

It is noted that in FIG. 2 there are shown output leads 10, 11, 12 and 13, associated with diodes $D_1$, $D_2$, $D_3$ and $D_4$, respectively. These output leads are utilized to provide the unbalanced voltages necessary to control the conventional small jets and their fuel supply to just counteract the drag forces.

What is claimed is:

1. In a zero drag satellite having a proof mass shielded from all effects except gravity, the improvement of an optical proof mass position pick-off comprising a flat screen in fixed relationship to said satellite, a mutliplicity of photodetectors equally spaced on said flat screen, and a light source in fixed relationship to said satellite providing a light beam, said proof mass initially interposed in a null position between said flat screen and said light source with said proof mass interrupting said light beam to cast a circular shadow on said flat screen, the periphery of which passes through the center of each of said photodetectors with a shift in the proof mass in any transverse direction causing the shadow to cover more of certain of said photodetectors and less of other, and the shift of the proof mass in an axial direction causing the shadow to cover more of all of said photodetectors or less of all of said photodetectors, the unbalance of the photodetectors outputs being used for activation purposes to change the direction of the zero-drag satellite until the proof mass returns to the null position.

2. A satellite control apparatus as described in claim 1 wherein said mass is spherical.

3. A satellite control apparatus as described in claim 2, wherein said light source is a point light source whose dimensions are much smaller than the diameter of said mass.

4. A satellite control apparatus as described in claim 1 with a second light source so disposed as to render the spherical mass free of all effects except gravity at its nominal or null position.

5. A satellite control apparatus embodying two pick-offs as described in claim 1 whose outputs are combined so as to improve linearity and whose light sources are so disposed as to render the spherical mass free of all effects except gravity at its nominal or null position.

* * * * *